(12) United States Patent
Robertson et al.

(10) Patent No.: US 7,594,625 B2
(45) Date of Patent: Sep. 29, 2009

(54) PROROTOR BLADE WITH LEADING EDGE SLOT

(75) Inventors: Daniel B. Robertson, Southlake, TX (US); Dudley E. Smith, Arlington, TX (US); Charles L. Hollimon, North Richland Hills, TX (US); Jimmy C. Narramore, Bedford, TX (US); Robert B. Mullins, Mansfield, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 10/543,222

(22) PCT Filed: Jan. 23, 2003

(86) PCT No.: PCT/US03/02049

§ 371 (c)(1),
(2), (4) Date: May 30, 2006

(87) PCT Pub. No.: WO2004/067380

PCT Pub. Date: Aug. 12, 2004

(65) Prior Publication Data

US 2006/0239824 A1    Oct. 26, 2006

(51) Int. Cl.
*B64C 39/00*    (2006.01)

(52) U.S. Cl. .................. 244/70; 416/148; 416/231 B

(58) Field of Classification Search .............. 416/1, 416/90 R, 91 A, 91, 148, 231 B; 244/6, 7 R, 244/12.4, 17.23, 17.25, 56, 66
See application file for complete search history.

(56) References Cited

U.S. PATENT DOCUMENTS

| 2,135,887 | A | * | 11/1938 | Fairey | 416/23 |
|---|---|---|---|---|---|
| 2,483,480 | A | * | 10/1949 | Stalker | 244/17.23 |
| 2,622,686 | A |   | 12/1952 | Chevreau et al. | |
| 2,650,045 | A | * | 8/1953 | Hunt | 244/13 |
| 2,716,460 | A | * | 8/1955 | Young | 416/24 |
| 2,973,925 | A | * | 3/1961 | Wiele | 244/203 |
| 3,556,439 | A | * | 1/1971 | Autry et al. | 244/210 |
| 3,588,273 | A |   | 6/1971 | Kizilos | 416/42 |
| 3,949,957 | A | * | 4/1976 | Portier | 244/210 |

(Continued)

OTHER PUBLICATIONS

Examination Report from the European Patent Office dated Oct. 18, 2007 for corresponding patent application EP No. 03815629.5

*Primary Examiner*—Michael R Mansen
*Assistant Examiner*—Valentina Xavier
(74) *Attorney, Agent, or Firm*—James E. Walton

(57) ABSTRACT

A proprotor blade (27a, 27b, 127a, 127b) having a fixed, spanwise, leading edge slot (215) located in at least the inboard portion of the proprotor is disclosed. The slot (215) is formed by a selectively shaped slat (217) disposed in a selectively shaped recessed area (219) located at the leading edge (202) of the main portion of the proprotor blade. The slot (215) is selectively shaped so the a portion of the airflow over the lower airfoil surface of the proprotor blade is diverted between the main portion of the proprotor blade and the slat (217) and exits at the upper airfoil surface of the proprotor blade. The present invention may be used on both military-type tiltrotor aircraft (11) and civilian-type tiltrotor aircraft (111) with only minor variations to accommodate the different shapes of the proprotor blades.

22 Claims, 6 Drawing Sheets

U.S. PATENT DOCUMENTS

| | | | |
|---|---|---|---|
| 4,360,176 A * | 11/1982 | Brown | 244/214 |
| 4,655,685 A | 4/1987 | Fradenburgh | 416/90 A |
| 4,840,540 A * | 6/1989 | Kallergis | 416/223 A |
| 5,791,875 A | 8/1998 | Ngo | 416/90 A |
| 6,497,385 B1 * | 12/2002 | Wachspress et al. | 244/7 R |
| 6,769,872 B2 * | 8/2004 | Torok et al. | 416/1 |
| 6,840,741 B1 * | 1/2005 | Wake et al. | 416/227 A |
| 6,932,569 B2 * | 8/2005 | Torok et al. | 416/1 |

* cited by examiner

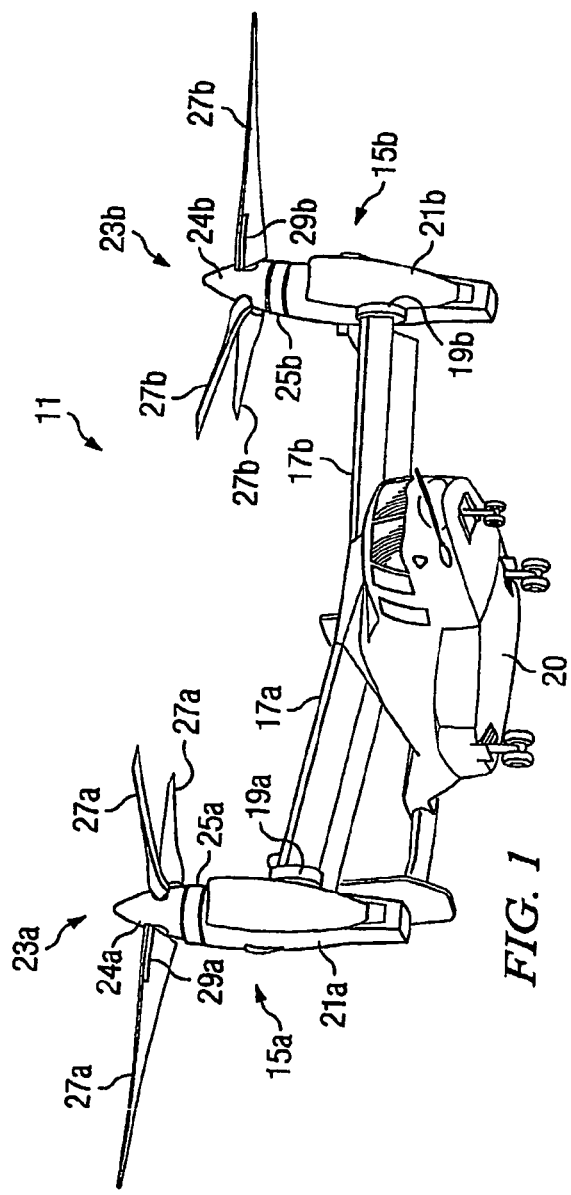
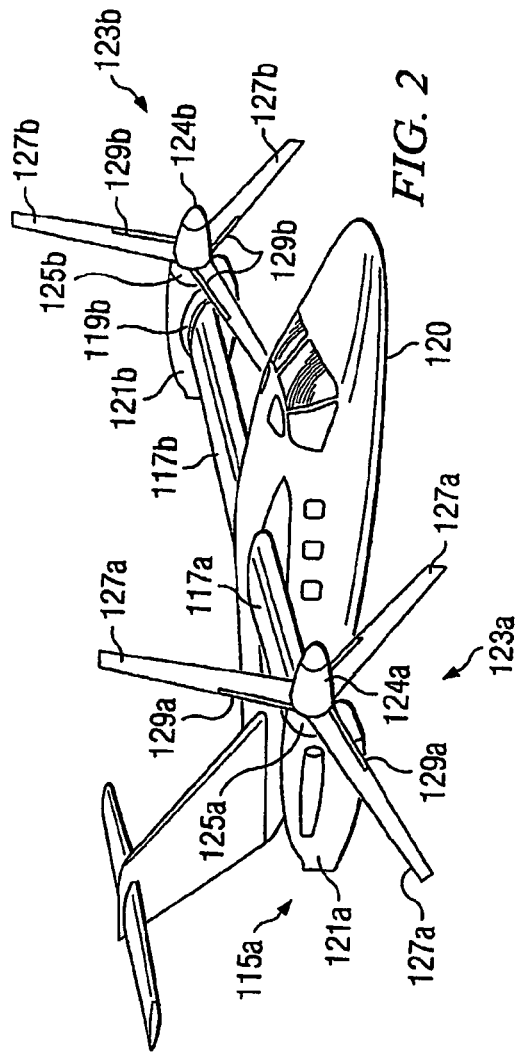
FIG. 1
FIG. 2

PROPROTOR BLADE WITH LEADING EDGE SLOT

TECHNICAL FIELD

The present invention relates to proprotors for tiltrotor aircraft and other rotorcraft. In particular, the present invention relates to proprotor blades with leading edge slots.

DESCRIPTION OF THE PRIOR ART

Tiltrotor aircraft are unique rotorcraft in that they have tiltrotor assemblies that operate between a helicopter mode in which the tiltrotor assemblies are rotated upward allowing the tiltrotor aircraft to take off, hover, fly, and land like a conventional helicopter; and an airplane mode, in which the tiltrotor assemblies are tilted forward allowing the tiltrotor aircraft to fly like a conventional fixed-wing propeller driven aircraft. The first tiltrotor aircraft were designed strictly for military purposes, but now efforts are being made to manufacture civilian-type tiltrotor aircraft, and "Quad" tiltrotor aircraft with two sets of wing assemblies and four tiltrotor nacelle assemblies.

Because tiltrotor aircraft must operate in both the helicopter mode and the airplane mode, and be able to operate while transitioning between the two, the rotor blades, referred to as proprotors, have characteristics and features of both helicopter rotor blades and airplane propellers. For example, proprotor blades are typically longer than airplane propellers, but shorter than helicopter rotor blades. In addition, proprotors generally have thick, twisted inboard portions like airplane propellers, but thin, flat blade tips, like helicopter rotor blades.

Although tilt rotor aircraft provide many unique advantages, they also present many unique challenges. One problem is that the size and length of proprotors are tightly constrained. Another problem in designing proprotors for tiltrotor aircraft is that changes that might increase performance in the helicopter mode, may adversely affect performance in the airplane mode, and vice versa. For example, a change that is known to improve hover thrust in the helicopter mode may create a significant drag penalty in the airplane mode. If large tiltrotor aircraft are going to be developed, they will require advanced high-lift concepts in order to keep the size of the proprotor from becoming extremely large.

Although great strides have been made in the area of rotorcraft design, significant challenges remain.

SUMMARY OF THE INVENTION

There is a need for a proprotor for tiltrotor aircraft and other rotorcraft that can provide improved hover maximum thrust capability without compromising the forward flight performance of the aircraft.

Therefore, it is an object of the present invention to provide a proprotor for a tiltrotor aircraft or other rotorcraft for which hover maximum thrust capability is increased without compromising the forward flight performance of the aircraft.

The above object is achieved by providing a proprotor blade having a fixed, spanwise, leading edge slot located in at least the inboard portion of the proprotor blade. The slot is formed by a selectively shaped slat disposed in a selectively shaped recessed area located at the leading edge of the main portion of the proprotor blade. The slot is selectively shaped so that a portion of the air flow over the lower airfoil surface of the proprotor blade is diverted between the main portion of the proprotor blade and the slat, and redirected over the upper airfoil surface of the proprotor blade. The present invention may be used on both military-type tiltrotor aircraft and civilian-type tiltrotor aircraft with only minor variations to accommodate the different shapes of the proprotor blades.

The proprotor blade with leading edge slot according to the present invention provides the following advantages: (1) significant maximum lift increments can be achieved without a significant increase in drag at low lift coefficients; (2) increases in maximum lift can be used to provide increases in maneuverability and agility, and/or increases in maximum payload; (3) 2-D dynamic stall vortex formation can be delayed to extremely high angles of attack; (4) pitching moment excursions caused by dynamic stall can be eliminated; (5) maximum lift-to-drag ratio capability is increased; (6) the slot is isolated from centrifugal force loads; (7) the blade spar can maintain a continuous load path; (8) aircraft vibration is reduced;.and (9) the slat can be easily removed in the field for repair or replacement without removing the entire proprotor blade.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings.

FIG. 1 is a perspective view of a military-type tiltrotor aircraft having proprotor blades with leading edge slots according to the present invention.

FIG. 2 is a perspective view of a civilian-type tilt rotor aircraft having proprotor blades with leading edge slots according to the present invention.

DESCRIPTION OF THE PREFERRED EMBODIMENT

Figure 3:
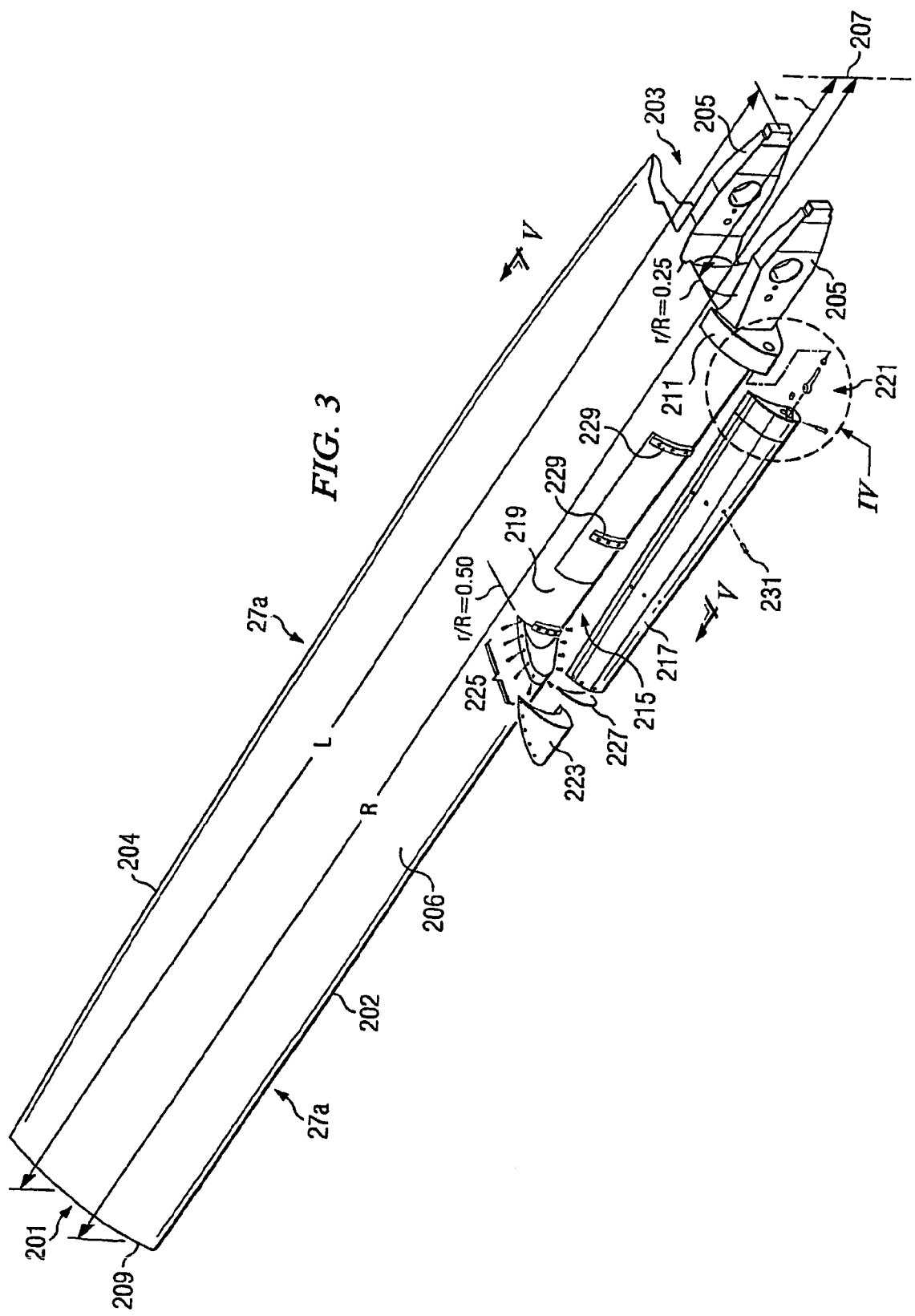
FIG. 3 is an exploded view of one of the proprotor blades of the military-type tiltrotor aircraft of FIG. 1.

The present invention represents a means of improving hover maximum thrust capability without compromising the forward flight performance of a tiltrotor aircraft or other rotorcraft. Although the present invention is described with reference to tiltrotor aircraft, it should be understood that the present invention may be used on other types of rotorcraft, such as tilt wing and tail sitter aircraft. It will also be appreciated that both the civilian and military tiltrotor aircraft described herein may have two wing assemblies and two tiltrotor assemblies, or may be "Quad" type tiltrotor aircraft having four wing members and four tiltrotor assemblies.

There are several possible approaches to improving hover maximum thrust capability without compromising forward flight performance, including variable geometry rotors, on-blade controls, active twist, and high-lift airfoils, The present invention focuses on the area of high-lift airfoils.

Under the high-lift airfoil approach, many different embodiments are available, including dynamic slots, dynamically deformable leading edges, circulation control, trailing edge flaps, dynamically coupled deformable shapes, and fixed slot configurations. Although each of these methods has certain benefits and advantages, the only one that does not require dynamically moving parts on the proprotor blade are fixed slot configurations. For this reason, the preferred embodiment of the present invention is a fixed leading edge slot.

At high angles of attack, it is desirable to have more lift and to have the air flowing over the airfoil surface without separation from the airfoil surface in the form of eddies. The separation reduces the lift and the eddies and other types of turbulent flow cause drag.

Recent research indicates that significant maximum lift increments can be achieved using leading edge slots. This increase in maximum lift can be used to provide an increase in maneuverability and agility and/or an increase in payload. The research also indicates that the use of leading edge slots delays 2-D dynamic stall vortex formation to extremely high angles of attack and eliminates the pitching moment excursions caused by 2-D dynamic stall. As such, reductions in vibratory loads can also be achieved by the leading edge slots of the present invention.

The configuration of the slot of the present invention is significant, because for some slot configurations, a large drag penalty is created at low lift coefficients, which adversely affects the power requirements of the tiltrotor aircraft.

There are several differences between proprotor blades for military-type tiltrotor aircraft and civilian-type tiltrotor aircraft, including the following: (1) military-type aircraft are typically larger and heavier than civilian-type tiltrotor aircraft, often requiring larger proprotor blades; (2) the proprotor blades on military-type more often include folding mechanisms, which require additional structural supports within the proprotor blade that must be accommodated; (3) for proprotor blades that do not include additional structural supports, which are more used often civilian-type tiltrotor aircraft, the fixed leading edge slots of the present invention can be located farther inboard near the axis of rotation of the proprotor blades. Although these differences may cause the shape of the fixed leading edge slot to differ between military-type and civilian-type tiltrotor aircraft, the main inventive concept of the present invention is the same for both types of tiltrotor aircraft. Indeed, the concept of the present invention is the same for all rotorcraft applications.

Referring to FIG. 1 in the drawings, a military-type tiltrotor aircraft 11 having proprotor blades with leading edge slots according to the present invention is illustrated. Tiltrotor nacelle assemblies 15a and 15b are carried by wing members 17a and 17b, and are pivotally disposed at end portions 19a and 19b of wing members 17a and 17b, respectively. Wing members 17a and 17b are coupled to a fuselage 20. Tiltrotor nacelle assemblies 15a and 15b include nacelles 21a and 21b, which house the engines, transmissions, and proprotor gear boxes that drive proprotors 23a and 23b. Proprotors 23a and 23b are disposed on the forward ends 25a and 25b of nacelles 21a and 21b, and include hubs 24a and 24b and proprotor blades 27a and 27b having fixed leading edge slots 29a and 29b, respectively. As is conventional with tiltrotor aircraft, proprotors 23a and 23b counter-rotate relative to each other, i.e., proprotor 23a rotates counterclockwise and proprotor 23b rotates clockwise if viewed looking in the aft direction while tiltrotor aircraft 11 is in the airplane mode.

Tiltrotor nacelle assemblies 15a and 15b rotate relative to wing members 17a and 17b between a helicopter mode in which tiltrotor nacelle assemblies 15a and 15b are tilted upward, such that tiltrotor aircraft 11 can take off, hover, fly, and land like a conventional helicopter; and an airplane mode in which tiltrotor nacelle assemblies 15a and 15b are tilted forward, such that tiltrotor aircraft 11 flies like a conventional fixed-wing propeller driven aircraft. In FIG. 1, tiltrotor aircraft 11 is shown in the helicopter mode.

Referring now to FIG. 2 in the drawings, a civilian-type tiltrotor aircraft 111 having proprotors with leading edge slots according to the present invention is illustrated. Tiltrotor nacelle assemblies 115a and 115b are carried by wing members 117a and 117b, and are disposed at end portions 119a and 119b of wing members 117a and 117b, respectively. Wing members 117a and 117b are coupled to a fuselage 120. Tiltrotor nacelle assemblies 115a and 115b include nacelles 121a and 121b, which house the engines, transmissions, and proprotor gear boxes that drive proprotors 123a and 123b. Proprotors 123a and 123b are disposed on the forward ends 125a and 125b of nacelles 121a and 121b, and include hubs 124a and 124b and proprotor blades 127a and 127b having fixed leading edge slots 129a and 129b, respectively. As is conventional with tiltrotor aircraft, proprotors 123a and 123b counter-rotate relative to each other, i.e., proprotor 123a rotates counterclockwise and proprotor 123b rotates clockwise if viewed looking in the aft direction while tiltrotor aircraft 111 is in the airplane mode.

Tiltrotor nacelle assemblies 115a and 115b rotate relative to wing members 117a and 117b between a helicopter mode in which tiltrotor nacelle assemblies 115a and 115b are tilted upward, such that tiltrotor aircraft 111 can take off, hover, fly, and land like a conventional helicopter; and an airplane mode in which tiltrotor nacelle assemblies 115a and 115b are tilted forward, such that tiltrotor aircraft 111 flies like a conventional fixed-wing propeller driven aircraft. In FIG. 2, tiltrotor aircraft 111 is shown in the airplane mode.

Figure 4:
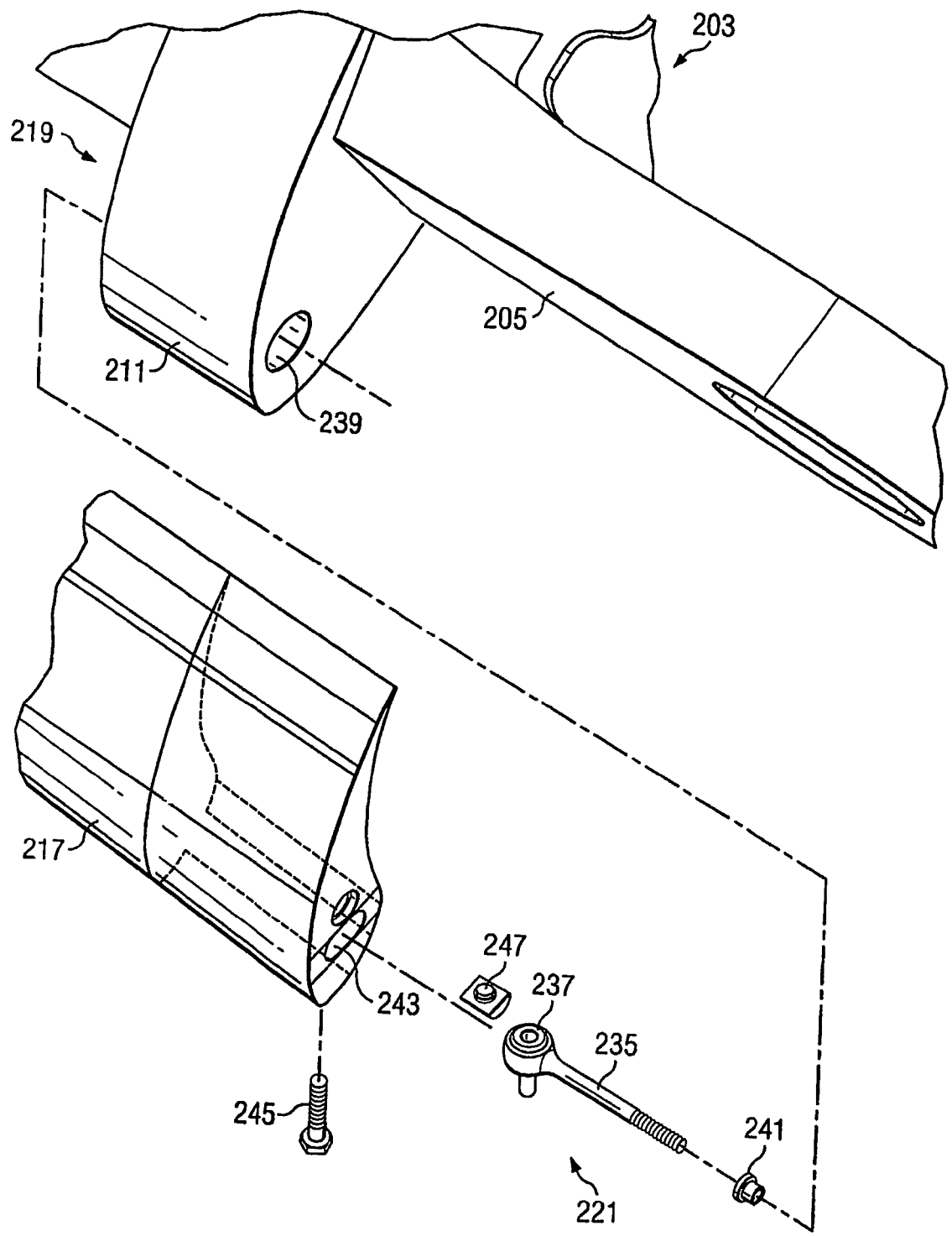
FIG. 4 is an enlarged assembly view of section IV of FIG. 3.

Referring now to FIGS. 3 and 4 in the drawings, proprotor blade 27a is illustrated in exploded assembly views. Proprotor blade 27a has an outboard end 201, an opposing inboard end 203, a leading edge 202, an opposing trailing edge 204, a blade tip 209, an overall longitudinal length L, and main upper airfoil surface 206. In certain applications, such as with military-tiltrotor aircraft 11, inboard end 203 includes one or more tangs 205 that are adapted for connection to hub 24a, a structural horn member 211, and additional interior support substructure as required (not shown). Tangs 205 facilitate connection of proprotor blade 27a to hub 24a and allow proprotor blade 27a to be folded for storage. It will be appreciated that proprotor blade 127a of civilian-type tiltrotor aircraft 111 typically has a shorter overall length L, may not require the additional interior structural support, and may not require tangs 205, as proprotor blades 127a typically do not require folding for storage.

Proprotor blade 27a has an axis of rotation 207 that generally passes through the center of hub 24a. Blade tip 209 is located at a distance R from axis of rotation 207. The distance from axis of rotation 207 to any point along proprotor blade 27a is represented by r, and may also be represented as the ratio r/R. The ratio r/R is also referred to herein as a "normalized blade station." For military-type tiltrotor aircraft 11, main upper airfoil surface 206 begins at r/R of about 0.25 and extends out to blade tip 209, i.e., r/R of 1.0.

Proprotor blade 27a includes a leading edge slot 215 according to the present invention. Slot 215 extends from blade station 0.25 to blade station 0.50. It should be understood that slot 215 may begin at any blade station and extend to any other blade station along the spanwise length of proprotor blade 27a. For example, because proprotor blade 127a of civilian-type tiltrotor aircraft 111 does not include tangs 205 and the additional inboard support, it is possible for leading edge slot 129a to begin at blade stations farther inboard than 25% of beam.

Slot 215 is formed by disposing a slat 217 in a recessed portion 219 of leading edge 202. Slat 217 is held in place at its inboard end with a tension/shear joint 221 and is covered at its outboard end with a fairing 223. Fairing 223 is fastened to proprotor blade 27a by fasteners 225. A seal member 227 is preferably disposed between the outboard end of slat 217 and fairing 223 to aerodynamically seal the gap. Seal member 227 is preferably made of or coated with a suitable low-friction material, or a suitable compressible material. For example, seal member 227 may be made from or coated with TEFLON or rubber. With this configuration, slat 217 is only structurally constrained at structural horn member 211.

A plurality of brace members 229 are disposed in recessed portion 219 and are bonded to main upper airfoil surface 206 to support slat 217. Slat 217 is coupled to brace members 229 by fasteners 231. It is preferred that brace members 229 be equally spaced along the length of leading edge slot 215. Brace members 229 carry lift and drag shear loads from slat 217 back into proprotor blade 27a.

Tension/shear joint 221 is shown in an enlarged view in FIG. 4. In the preferred embodiment, tension/shear joint 221 is a ball joint. However, it should be understood that the functionality of tension/shear joint 221 may be achieved by a wide variety of assemblies and configurations capable of carrying centrifugal force tension and shear, without generating any bending moments. In this embodiment, tension/shear joint 221 Includes a rigid link 235 that terminates on its outboard end with a spherical bearing 237. Rigid link 235 passes through an aperture 239 in structural horn member 211 and is held in place by a retaining barrel 241. Spherical bearing 237 is disposed within a longitudinal bore 243 in slat 217 and is received by a pivot pin 245 that passes through the inboard end of slat 217. Pivot pin 245 is held in place by a retaining nut 247. This allows tension/shear joint 221 to carry all of the centrifugal force loads and transfer them back from slat 217 to proprotor blade 27a. With this configuration, slat 217 carries shear loads from lift and drag, but does not transmit centrifugal force loads to either the fairing 223 or the proprotor blade 27a, except at inboard structural horn member 211, and introduces no bending moments.

Figure 5:
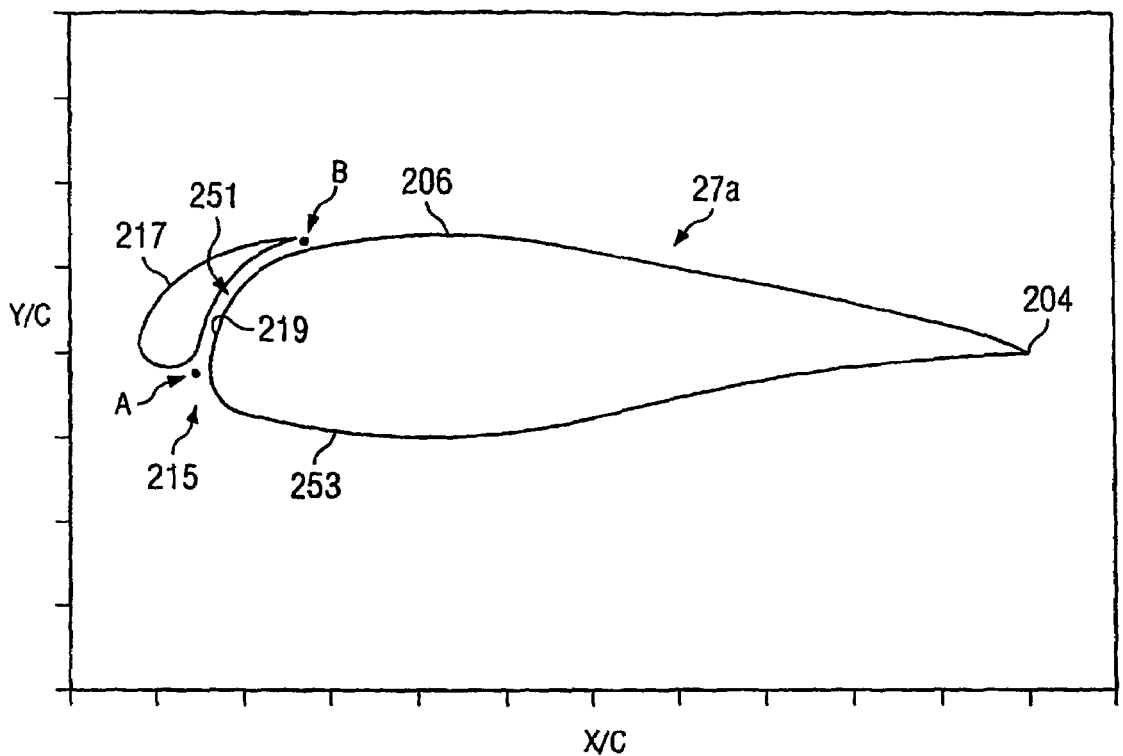
FIG. 5 is a schematic showing the chordwise cross-sectional profile of the proprotor blade of FIG. 3 taken at V-V.

Referring now to FIG. 5 in the drawings, a schematic showing a chordwise cross-sectional profile of leading edge slot 215 of proprotor blade 27a taken at V-V in FIG. 3 is illustrated. Although this chordwise profile represents an exemplary blade station, it will be appreciated that the cross-sectional profile will vary somewhat along the spanwise length of proprotor blade 27a. In FIG. 5, the horizontal axis represents the ratio x/C, where x is the distance to a particular point as measured back from the leading edge, and C is the total chordwise length from the leading edge to the trailing edge. Thus, the ratio of x/C would be 1.0 at the trailing edge.

In a similar fashion, the vertical axes represent the ratio y/C, where y is the distance to a particular point as measured up and down from the chord axis, and C is the total chordwise length. Thus, the ratio of y/C would be 0.0 at the chord axis.

If additional cross-sectional profiles were shown, the thickness, width, and cross-sectional shape of proprotor blade 27a, recessed portion 219, and slat 217 would vary along the longitudinal length of slot 215. It will be appreciated that these shapes would smoothly transition from one blade station to the next according to conventional curve fitting techniques. This configuration allows proprotor blade 27a and slot 215 to function over a wide range of angles of attack. As is shown, slot 215 forms a narrow, curved channel 251 between the leading edge of recessed portion 219 and the rear surface of slat 217. Channel 251 begins at point A located at the leading edge of a lower airfoil surface 253 and extends upward around the leading edge of recessed portion 219 in a curved fashion. Channel 251 turns rearward and terminates at point B on upper airfoil surface 206.

As explained above, at high angles of attack, it is desirable to have more lift and to have the air flowing smoothly over upper airfoil surface 206 without eddies or other turbulent flow. The separation reduces the lift and the eddies and other types of turbulent flow cause drag. The unique configuration of channel 251 helps turn the airflow over upper airfoil surface 206, and prevents the airflow from separating from upper airfoil surface 206 in the form of eddies, thus eliminating the introduction of any undesirable drag.

Figure 6:
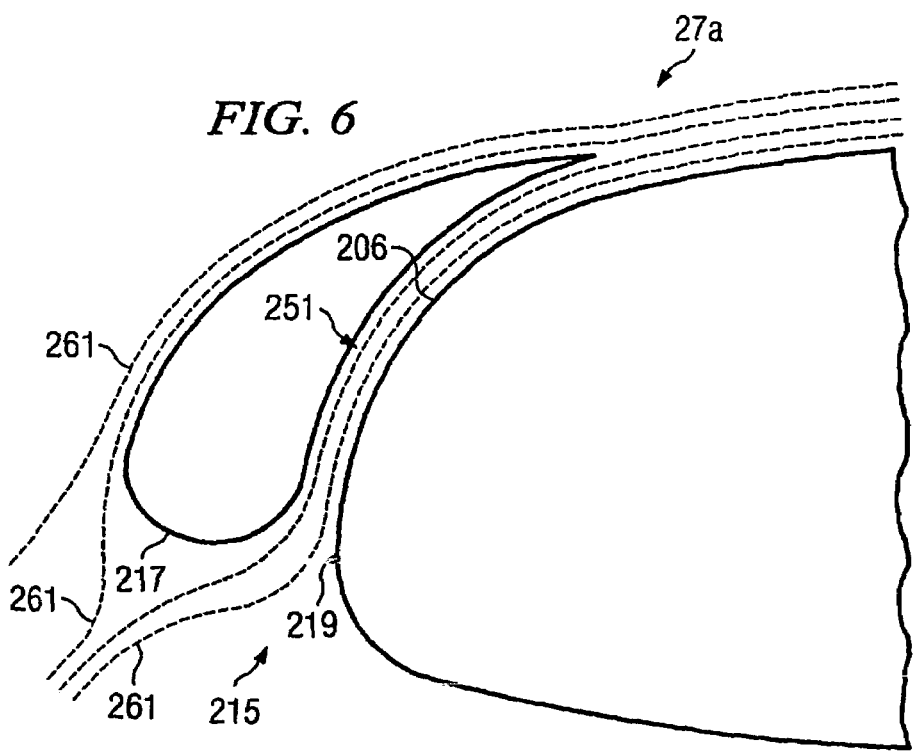
FIG. 6 is a partial chordwise cross-sectional schematic showing the pressure coefficient at various locations through a leading edge slot of a proprotor blade of the present invention.

Referring now to FIG. 6 in the drawings, a partial chordwise cross-sectional schematic showing the pressure coefficient, a conventional normalized pressure measurement, at various points on and around channel 251 is illustrated. The pressure coefficient is represented in a grayscale fashion. A plurality of lines 261 are indicative of the airflow through slot 215 and over upper airfoil surface 206. Lines 261 are similar to smoke lines in a wind tunnel. As is shown, the airflow is smooth and continuous. The airflow matches the contour of channel 251 and upper airfoil surface 206. Channel 251 ensures that the airflow does not separate or break away from upper airfoil surface 206, and prevents the airflow from becoming turbulent or riddled with eddies.

Figure 7:
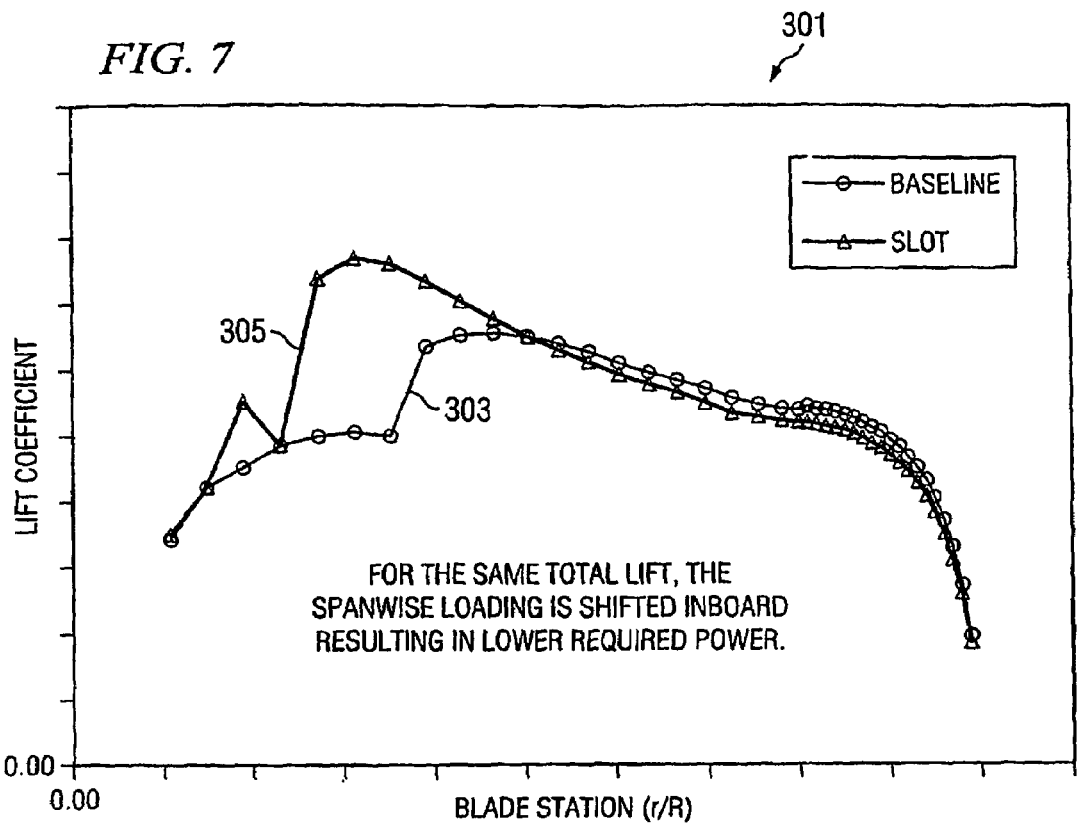
FIG. 7 is a graph comparing a curve of the lift coefficient at various points along the spanwise length for a conventional proprotor blade with a curve of the lift coefficient for a proprotor blade according to the present invention.

Referring now to FIG. 7 in the drawings, a graph 301 comparing a curve 303 of the lift coefficient at various points along the spanwise length of a conventional proprotor blade with a curve 305 of the lift coefficient for proprotor blade 27a is illustrated. In FIG. 7, the horizontal axis of graph 301 represents the blade station expressed as the ratio r/R, where r is the spanwise distance to a particular point as measured out from axis of rotation 207, and R is the total spanwise length from axis of rotation 207 to blade tip 209. Thus, the ratio of r/R would be 1.0 at blade tip 209. As is shown by curve 303, without slot 215, outboard end 201 of proprotor blade 27a must be loaded more. This results in the entire proprotor blade 27a stalling earlier. On the other hand, by using slot 215, more load can be carried by inboard end 203. Thus, for the same total lift, the spanwise loading is shifted inboard, resulting in lower required power. Thus, the present invention makes entire proprotor blade 27a more efficient.

Figure 8:
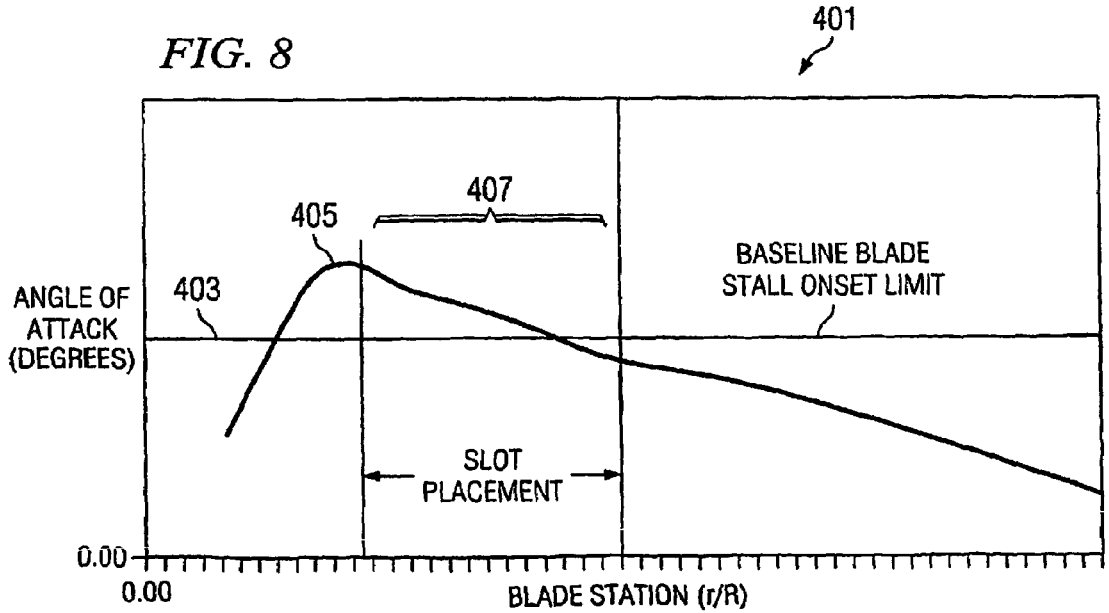
FIG. 8 is a graph showing the stall onset limit angle of attack at various points along the spanwise length a proprotor blade according to the present invention.

Referring now to FIG. 8 in the drawings, a graph 401 comparing a curve 403 of the blade stall onset limit angle of attack at various points along the spanwise length of a conventional proprotor blade with a curve 405 of the blade stall onset limit angle of attack for proprotor blade 27a is illustrated. In FIG. 8, the horizontal axis of graph 401 represents the blade station expressed as the ratio r/R, where r is the spanwise distance to a particular point as measured out from axis of rotation 207, and R is the total spanwise length from axis of rotation 207 to blade tip 209. Thus, the ratio of r/R would be 1.0 at blade tip 209.

As is shown, curve 405 extends above curve 403 in a certain range of r/R. In this range, the presence of a leading edge slot will increase the maximum angle of attack that a proprotor blade can withstand without stalling under the stated operating conditions. If a leading edge slot is located outside of this range, it does not add to the maximum angle of attack that can be achieved by the proprotor blade without stalling. Of course, the range and magnitude of the increased angle of attack will vary for other operating conditions. Thus, it will be appreciated that graphs such as graph 401 are useful for determining the ideal spanwise length and placement of leading edge slots according to the present invention.

An exemplary range 407 from a first blade station to a second blade station has been indicated on graph 401. Range 407 represents the length and boundaries of slot 215 of proprotor blade 27*a*. These boundaries are chosen because the first blade station is the inboard-most location of upper airfoil surface 206, and the second blade station ensures that slot 215 is located within a range for which an increased angle of attack is achievable. As is shown, a leading edge slot would be advantageous up to an inboard first blade station r/R for proprotor blades having airfoil surfaces that begin that far inboard, such as might be the case for civilian-type tiltrotor aircraft 111, in which proprotor blades 127*a* and 127*b* do not have to accommodate additional support structures and folding mechanisms.

Figure 9:
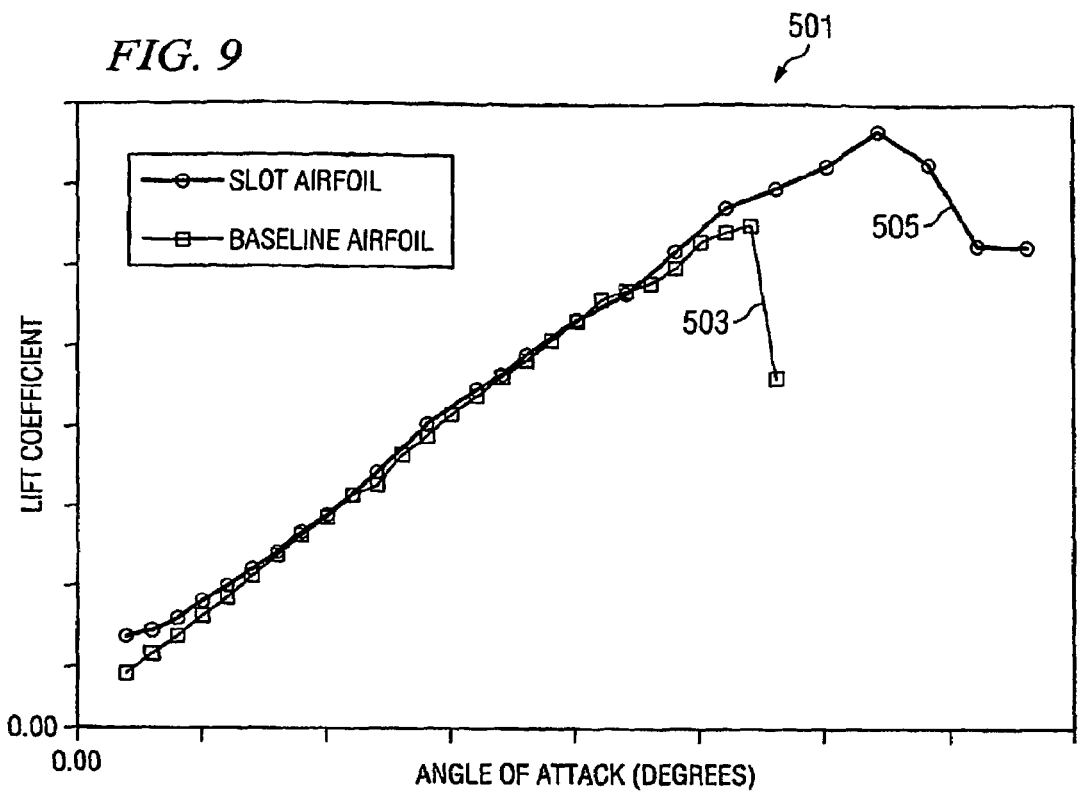
FIG. 9 is a graph comparing a curve of lift coefficient at various angles of attack for a conventional proprotor blade with a curve of lift coefficient for a proprotor blade according to the present invention.

Referring now to FIG. 9 in the drawings, a graph 501 comparing a curve 503 of lift coefficient at various angles of attack for a conventional proprotor blade with a curve 505 of lift coefficient for proprotor blade 27*a* is illustrated. Graph 501 shows the lift coefficient as a function of angle of attack. As is shown, curve 505 for proprotor blade 27*a* represents an increase of about 29% in the maximum lift coefficient and an increase of about 5% in stall angle.

Figure 10:
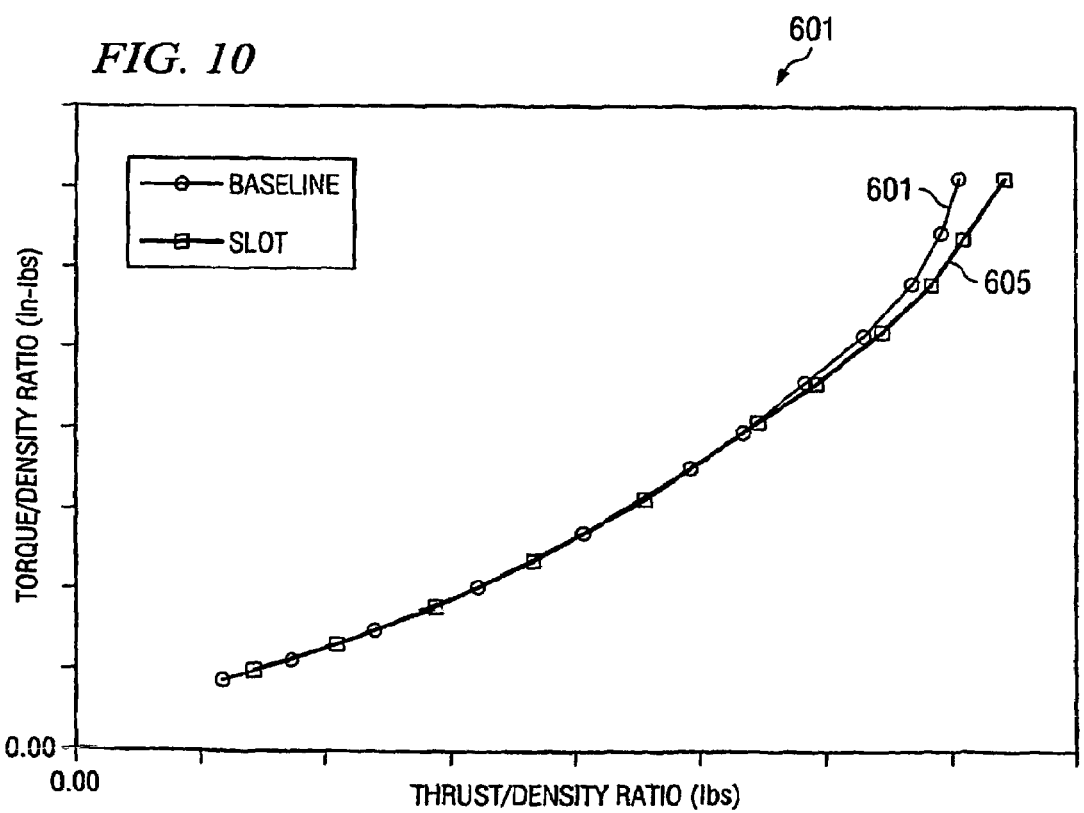
FIG. 10 is a graph comparing a curve of torque/density ratio at various thrust/density ratios for a conventional proprotor blade with a curve of torque/density ratio for a proprotor blade according to the present invention.

Referring now to FIG. 10 in the drawings, a graph 601 comparing a curve 603 of torque/density ratio at various thrust/density ratios for a conventional proprotor blade with a curve 605 of torque/density ratio for proprotor blade 27*a* is illustrated. Graph 601 shows proprotor blade horsepower as a function of rotor thrust. As is shown, curve 605 for proprotor blade 27*a* represents an increase of about 3.25% in the isolated proprotor out of ground effect thrust capability. By using leading edge slot 215, this increase is possible without a forward flight drag penalty.

Although the present invention has been described with reference to military-type tiltrotor aircraft 11 and civilian-type tiltrotor aircraft 111, it should be understood that the present invention may be used with any tiltrotor aircraft or rotorcraft in which the proprotors transition between a helicopter mode and an airplane mode, including "Quad" tiltrotor aircraft having two sets of wing assemblies and four tiltrotor nacelle assemblies.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A proprotor blade comprising:
    a proprotor airfoil for a tiltrotor aircraft having an inboard end and an opposing outboard end, an upper airfoil surface and an opposing lower airfoil surface, and a leading edge and an opposing trailing edge, wherein the inboard end is adapted for coupling to a rotor hub;
    a recessed portion disposed proximate the inboard end of the airfoil in the leading edge;
    a fixed slat having an inboard end and an opposing outboard end, the slat being disposed over the recessed portion forming a leading edge slot passing from the lower airfoil surface to the upper airfoil surface;
    a structural member disposed at the inboard end of the airfoil; and
    a tension/shear joint for coupling the inboard end of the slat to the structural member; whereby centrifugal force loads are transmitted from the slat to the airfoil only through the structural member.

2. The proprotor blade according to claim 1, further comprising:
    a fairing for coupling the outboard end of the slat to the airfoil.

3. The proprotor blade according to claim 1, wherein the tension/shear joint is a ball joint comprising:
    a rigid link adapted at one end for coupling to the structural member and having a barrel retainer at the other end, the barrel retainer being adapted for pivotal coupling to inboard end of the slat.

4. The proprotor blade according to claim 2, further comprising:
    a friction reducing shim disposed between the fairing and the slat;
    whereby the slat carries shear loads from lift and drag, but does not transmit centrifugal force loads through the fairing.

5. The proprotor blade according to claim 1, further comprising:
    at least one brace member disposed between the slat and the recessed portion for supporting the slat.

6. The proprotor blade according to claim 1, wherein the leading edge slot extends only partially along the spanwise length of the airfoil.

7. The proprotor blade according to claim 1, wherein the leading edge slot extends substantially along the entire spanwise length of the airfoil.

8. The proprotor blade according to claim 1, wherein the leading edge slot forms a smooth channel that curves upward and rearward, the channel being configured to prevent airflow from separating from the upper and lower airfoil surfaces.

9. The proprotor blade according to claim 1, wherein the leading edge slot forms a smooth channel that curves upward and rearward, the channel being configured to prevent airflow from separating from the airfoil.

10. The proprotor blade according to claim 1, wherein the cross-sectional profile of the leading edge slot varies along the spanwise length of the airfoil.

11. A tiltrotor aircraft comprising:
    a fuselage;
    a wing member coupled to the fuselage;
    a tiltrotor nacelle assembly pivotally coupled to the wing member;
    a drive means carried by the tiltrotor nacelle assembly, the drive means having an engine, a transmission, and a rotor hub; and
    at least one proprotor coupled to the rotor hub, the proprotor including an airfoil having an inboard end and an opposing outboard end, an upper airfoil surface and an opposing lower airfoil surface, and a leading edge and an opposing trailing edge, wherein the inboard end is adapted for coupling to a rotor hub, a recessed portion disposed proximate the inboard end of the airfoil in the leading edge, a fixed slat having an inboard end and an opposing outboard end, the slat being disposed over the recessed portion forming a leading edge slot passing from the lower airfoil surface to the upper airfoil surface, a structural member disposed at the inboard end of the airfoil; and a tension/shear joint for coupling the inboard end of the slat to the structural member; whereby centrifugal force loads are transmitted from the slat to the airfoil only through the structural member.

12. The tiltrotor aircraft according to claim 11, further comprising:
a fairing for coupling the outboard end of the slat to the airfoil.

13. The tiltrotor aircraft according to claim 11, wherein the tension/shear joint is a ball joint comprising:
a rigid link adapted at one end for coupling to the structural member and having a barrel retainer at the other end, the barrel retainer being adapted for pivotal coupling to inboard end of the slat.

14. The tiltrotor aircraft according to claim 12, further comprising:
a friction reducing shim disposed between the fairing and the slat;
whereby the slat carries shear loads from lift and drag, but does not transmit centrifugal force loads through the fairing.

15. The tiltrotor aircraft according to claim 11, further comprising:
at least one brace member disposed between the slat and the recessed portion for supporting the slat.

16. The tiltrotor aircraft according to claim 11, wherein the leading edge slot extends only partially along the spanwise length of the airfoil.

17. The tiltrotor aircraft according to claim 11, wherein the leading edge slot extends substantially along the entire spanwise length of the airfoil.

18. The tiltrotor aircraft according to claim 11, wherein the leading edge slot forms a smooth channel that curves upward and rearward, the channel being configured to prevent airflow from separating from the upper airfoil surface.

19. The tiltrotor aircraft according to claim 11, wherein the leading edge slot forms a smooth channel that curves upward and rearward, the channel being configured to prevent airflow from becoming turbulent.

20. The tiltrotor aircraft according to claim 11, wherein the cross-sectional profile of the leading edge slot varies along the spanwise length of the airfoil.

21. A method of increasing helicopter mode lift without increasing airplane mode drag in a tiltrotor aircraft, the method comprising the steps of:
providing a tiltrotor aircraft having a fuselage, a wing member coupled to the fuselage, a tiltrotor assembly pivotally coupled to the wing member, and a drive means carried by the tiltrotor assembly, the drive means having an engine, a transmission, and a rotor hub;
coupling at least one proprotor to the rotor hub, the proprotor including an airfoil having an inboard end and an opposing outboard end, an upper airfoil surface and an opposing lower airfoil surface, and a leading edge and an opposing trailing edge;
forming a leading edge slot in the proprotor passing from the lower airfoil surface to the upper airfoil surface by creating a recessed portion rroximate the inboard end of the airfoil in the leading edge and disposing a fixed slat having an inboard end and an opposing outboard end over the recessed portion;
providing a structural member disposed at the inboard end of the airfoil; and
providing a tension/shear joint for coupling the inboard end of the slat to the structural member, whereby centrifugal force loads are transmitted from the slat to the airfoil only through the structural member.

22. The method according to claim 21, wherein the step of disposing the slat over the recessed portion comprises the steps of:
providing a fairing;
coupling the fairing to the proprotor; and
coupling the outboard end of the slat to the fairing.

* * * * *